US005906757A

United States Patent [19]

Kong et al.

[11] Patent Number: 5,906,757

[45] Date of Patent: May 25, 1999

[54] LIQUID INJECTION PLASMA DEPOSITION METHOD AND APPARATUS

[75] Inventors: Peter C. Kong; Arthur D. Watkins, both of Idaho Falls, Id.

[73] Assignee: Lockheed Martin Idaho Technologies Company, Idaho Falls, Id.

[21] Appl. No.: 08/533,886

[22] Filed: Sep. 26, 1995

[51] Int. Cl.$^{6}$ .................................................... B23K 10/00

[52] U.S. Cl. ................................ 219/121.47; 219/76.16; 219/121.48; 219/121.36; 427/446

[58] Field of Search ........................... 219/121.47, 76.15, 219/76.16, 121.48, 121.51, 121.36; 427/446, 535, 569, 509; 315/111.51, 111.21, 111.41

[56] References Cited

U.S. PATENT DOCUMENTS

| | | | |
|---|---|---|---|
| 3,839,618 | 10/1974 | Muehlberger | 219/76.16 |
| 4,445,021 | 4/1984 | Irons et al. | 219/121.48 |
| 4,741,286 | 5/1988 | Irons et al. | 118/620 |
| 5,047,612 | 9/1991 | Savkar et al. | 219/121.47 |
| 5,201,939 | 4/1993 | Siemers | 75/10.19 |
| 5,217,747 | 6/1993 | Tsantrizos et al. | 427/455 |
| 5,316,579 | 5/1994 | McMillan et al. | 118/50 |
| 5,445,324 | 8/1995 | Berry et al. | 239/99 |
| 5,451,260 | 9/1995 | Versteeg et al. | 118/725 |
| 5,496,655 | 3/1996 | Lessing | 429/34 |
| 5,560,844 | 10/1996 | Boulos et al. | 219/121.59 |

*Primary Examiner*—Mark H. Paschall
*Attorney, Agent, or Firm*—Klaas Law O'Meara & Malkin

[57] ABSTRACT

A liquid injection plasma torch deposition apparatus for depositing material onto a surface of a substrate may comprise a plasma torch for producing a jet of plasma from an outlet nozzle. A plasma confinement tube having an inlet end and an outlet end and a central bore therethrough is aligned with the outlet nozzle of the plasma torch so that the plasma jet is directed into the inlet end of the plasma confinement tube and emerges from the outlet end of the plasma confinement tube. The plasma confinement tube also includes an injection port transverse to the central bore. A liquid injection device connected to the injection port of the plasma confinement tube injects a liquid reactant mixture containing the material to be deposited onto the surface of the substrate through the injection port and into the central bore of the plasma confinement tube.

29 Claims, 6 Drawing Sheets

LIQUID INJECTION PLASMA DEPOSITION METHOD AND APPARATUS

CONTRACTUAL ORIGIN OF THE INVENTION

The United States Government has rights in this invention disclosed under Contract Number DE-AC07-76ID01570 between the U.S. Department of Energy and EG&G Idaho, Inc., now Contract Number DE-AC07-94ID13223 with Lockheed Idaho Technologies Company.

FIELD OF THE INVENTION

This invention relates to plasma processing in general and more specifically to a method and apparatus for liquid injection plasma deposition.

BACKGROUND OF THE INVENTION

Numerous film deposition processes are known for depositing coatings or films onto the surfaces of various kinds of objects or substrates. One type of deposition process, known as chemical vapor deposition (CVD), is usually carried out in a vacuum chamber and in the presence of a reactive process gas, or a mixture of process gases, that are maintained under very low pressure. The material to be coated, usually referred to as the substrate, is placed in the vacuum chamber and is heated to a temperature sufficient to cause the reactive process gas (or mixture of gases) to react and deposit themselves on the surface of the substrate material. For example, the CVD process is widely used in the electronics industry to form various types of coatings, including silicon dioxide, silicon nitride, and polysilicon. While the CVD process carries with it the advantages of producing high quality surface coatings, with high densities, excellent adhesion, and fairly small microstructure, it suffers the disadvantage of being very expensive. Another disadvantage is that the deposition rate is very slow, on the order of 100 Å or so per hour, and CVD cannot be used to produce coatings thicker than a few hundred angstroms.

Another kind of deposition process is known as thermal spraying or plasma spraying and is generally carried out at atmospheric pressure. In the thermal spraying process, the material to be deposited on the substrate is injected into a high temperature flame or plasma in a dry powder form. The high temperature plasma flame vaporizes a portion of the dry powder material, although a significant percentage of the material does not vaporize completely, but instead remains in the liquid state as small molten droplets. The liquid and vapor are then deposited on the substrate to form the surface coating. While the thermal spraying process has the advantages of being relatively inexpensive and can deposit coatings of virtually any thickness at high deposition rates, on the order of several tens of millimeters per hour, the presence of the molten droplets of material tends to significantly degrade the quality of the coating. Consequently, coatings deposited by thermal spraying tend to suffer in terms of adhesion, density, fracture toughness, hardness, composition homogeneity, uniformity, surface smoothness, and microstructure development.

Low pressure plasma spraying is essentially the same as thermal spraying, except that it is carried out under a partial vacuum or a "soft" vacuum. As a result, the low pressure plasma spraying process generally produces slightly higher quality surface coatings compared to atmospheric thermal spraying, while only suffering a slight reduction in deposition rate and the ability to produce thick coatings. Unfortunately, the need to carry out the process in a soft vacuum substantially increases the cost of low pressure plasma spraying, and the coating quality is not that much greater than is possible with conventional plasma or thermal spraying at atmospheric pressure.

While numerous other deposition processes are known and used, such as sputtering and vacuum deposition, such other deposition processes generally are not appropriate substitutes for the CVD or thermal spraying processes. For example, while coatings produced by sputtering are of excellent quality, with very high densities, extremely fine microstructure, and outstanding adhesion, the sputtering process must be performed under a "hard" vacuum and usually requires expensive and complex equipment. Also, sputtering technology has not yet developed to the point where it can produce certain types of coatings, such as certain oxide coatings, ceramic coatings, and cements. While the vacuum deposition process is considerably less expensive then sputtering, the deposition rates are extremely slow and coatings produced thereby are characterized by very poor adhesion. Also, the vacuum deposition process can only be used for certain types of coatings.

Consequently, there remains a need for a deposition process that can deposit relatively thick coatings at high rates, yet still produce high quality surface coatings in terms of adhesion, density, fracture toughness, hardness, composition homogeneity, uniformity, surface smoothness, and microstructure development. Put in other words, such a deposition process should achieve high quality surface coatings, comparable to the quality typically associated with chemical vapor deposition CVD processes, yet at the high deposition rates typically associated with plasma spraying processes. Additional advantages could be realized if such a deposition process would allow for the control of the oxidization/reduction state of the coating material, thus allow compound coatings to be produced. Still other advantages could be realized if the deposition process could be carried out at atmospheric pressure and with relatively inexpensive equipment.

SUMMARY OF THE INVENTION

A liquid injection plasma torch deposition apparatus for depositing material onto a surface of a substrate may comprise a plasma torch for producing a jet of plasma from an outlet nozzle. A plasma confinement tube having an inlet end and an outlet end and a central bore therethrough is aligned with the outlet nozzle of the plasma torch so that the plasma jet is directed into the inlet end of the plasma confinement tube and emerges from the outlet end of the plasma confinement tube. The plasma confinement tube also includes an injection port transverse to the central bore. A liquid injection device connected to the injection port of the plasma confinement tube injects through the injection port and into the central bore of the plasma confinement tube a liquid reactant mixture containing the material to be deposited.

A method of producing a plasma jet for depositing a thin film of material onto a surface of a substrate may comprise the steps of: Directing a jet of plasma into the central bore of the plasma confinement tube; and injecting the liquid reactant mixture into the injection port of the plasma confinement tube, wherein the liquid material is vaporized by the jet of plasma within the central bore and carried along with the jet of plasma and deposited onto the surface of the substrate.

The plasma confinement tube used in the liquid injection plasma deposition assembly allows the coating material to be injected into the plasma jet in a liquid state, which results in much more complete and uniform vaporization of the coating material within the plasma jet. While a small portion of the coating material may remain in a liquid state, it tends to be dispersed in the form of much smaller droplets than was typically associated with prior art thermal spraying devices. The more complete vaporization and much smaller liquid droplet size of the coating material results in coatings of much higher quality in terms of adhesion, density, fracture toughness, hardness, composition homogeneity, uniformity, surface smoothness, and microstructure development. Another advantage is that the invention can be used to deposit a wide variety of compositions, and will allow for the selective control of the oxidization/reduction state of the material to be deposited on the object.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
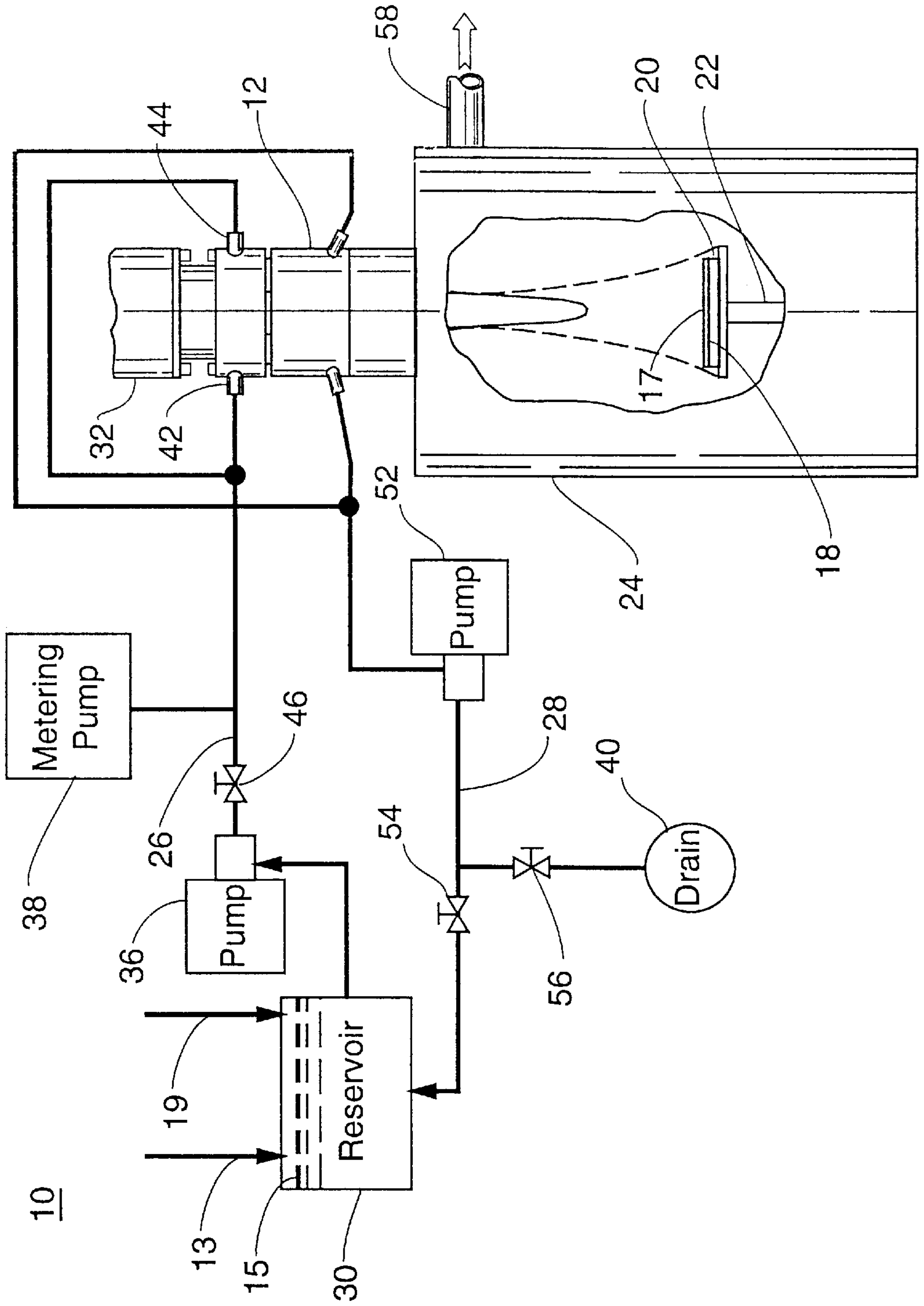
FIG. 1 is a schematic view of the liquid injection plasma torch apparatus according to the present invention.
Figure 2:
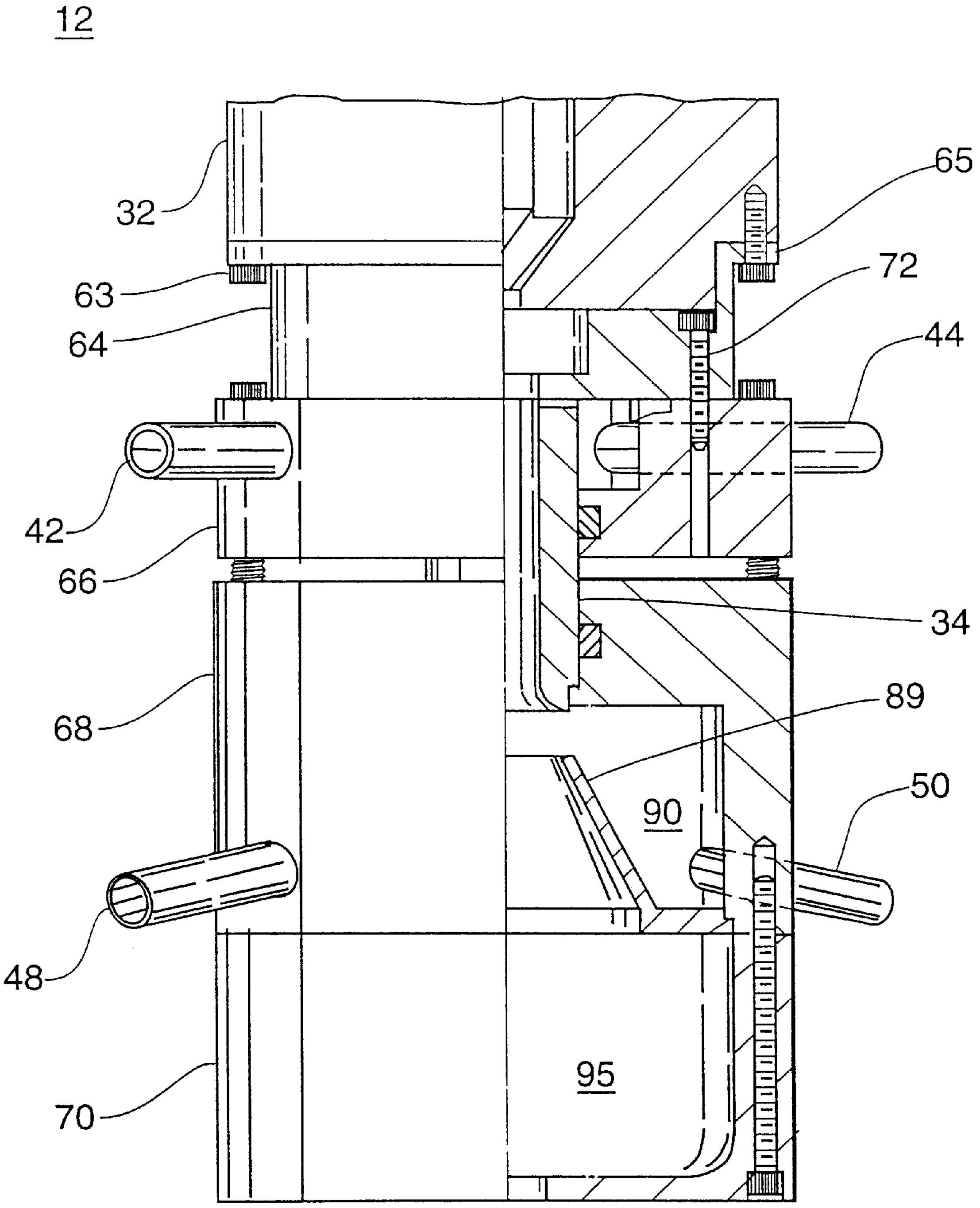
FIG. 2 is a side view in elevation of one embodiment a plasma gun with the right hand side broken away to show the internal structure.

The liquid injection plasma deposition assembly 10 according to the present invention is best seen in FIGS. 1 and 2 as it could be used to deposit a thin film or coating 17 onto the surface 18 of an object 20. The deposition process may be carried out under a "soft" vacuum in a suitable vacuum chamber 24 with the object 20 being supported by a holding fixture 22, as shown in FIG. 1. Alternatively, the deposition process may be carried out at atmospheric pressure, as will be described in greater detail below. The chemical composition 19 that comprises the material being deposited on the object is first mixed with a liquid carrier composition 13, such as, for example water, to form a liquid reactant mixture 15 that is stored in reservoir 30. The liquid reactant mixture 15 is then injected under pressure into a plasma gun 12. Inside the plasma gun 12, the liquid reactant mixture 15 is heated in excess of 2500° K. by the superheated plasma comprising plasma jet 14. The superheated plasma vaporizes and dissociates the liquid reactant mixture 15 into various reactive species that comprise material stream 16 and may be used to form surface coating 17.

As will be described in greater detail below, the plasma gun 12 includes a conventional plasma torch assembly 32 for producing the plasma jet 14. Plasma gun 12 also includes a plasma confinement tube 34 (FIG. 2) through which passes the plasma jet 14 and into which is injected the liquid reactant mixture 15. The plasma confinement tube 34 may take on different configurations depending on the kind of material to be deposited as well as on the desired characteristics of the deposited film. For example, in the embodiment shown in FIGS. 1–6, the plasma confinement tube 34 includes a plurality of tangentially oriented injection ports 80 (FIG. 4) and is cooled by a thin film of liquid reactant material 15 that adheres to the central bore 78 of plasma confinement tube 34.

Figure 7:
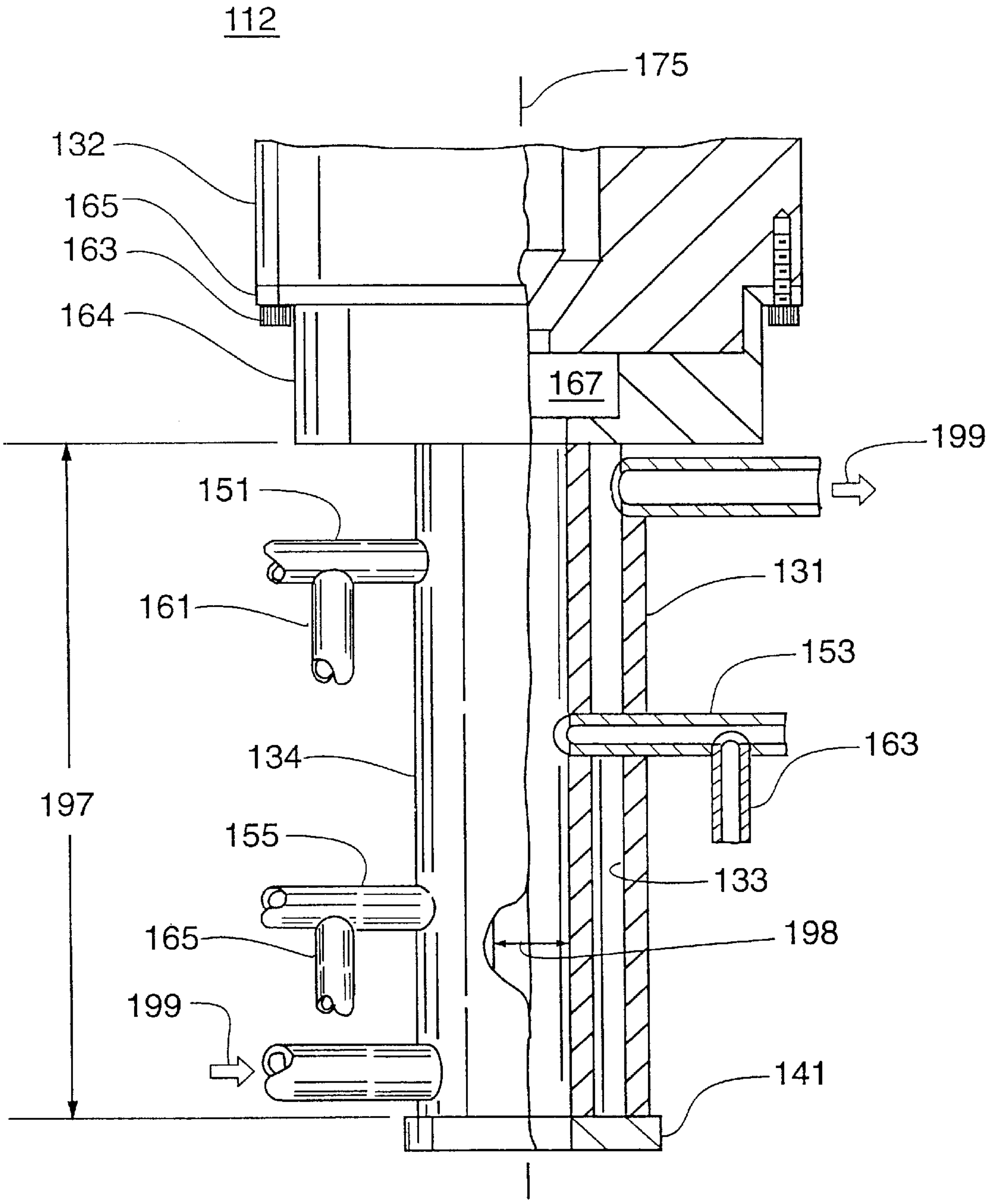
FIG. 7 is a side view in elevation of another embodiment of a plasma gun with a portion of the right hand side broken away to show the internal structure.
Figure 8:
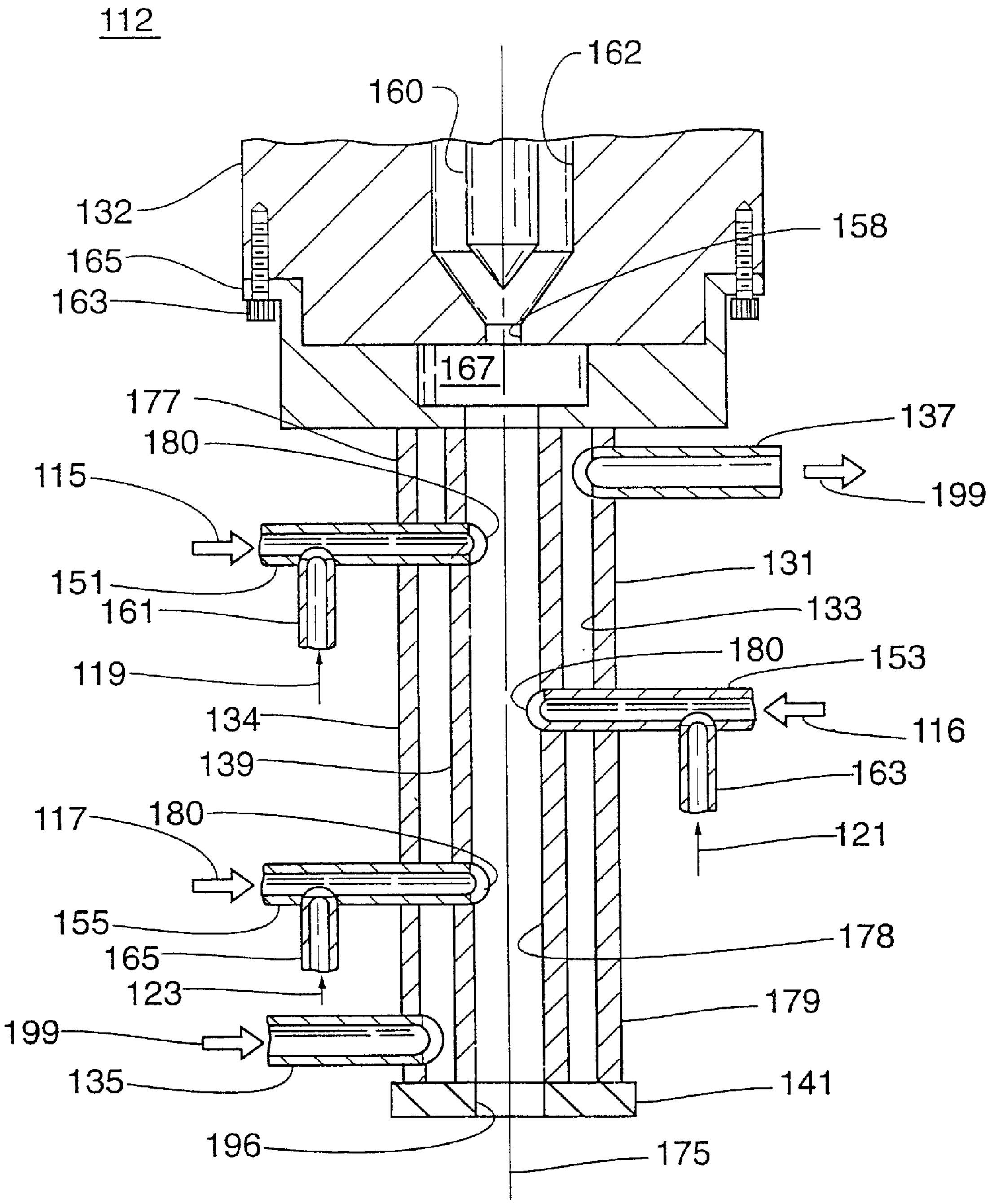
FIG. 8 is a sectional view in elevation of the plasma gun shown in FIG. 7.

In another embodiment 112, shown in FIGS. 7 and 8, the plasma confinement tube 134 includes a plurality of radially oriented injection ports 180 and is cooled by a separate liquid coolant 199 flowing through an annular cooling space 133 that surrounds the plasma confinement tube 134. In this alternate embodiment 112, the material to be deposited may be injected into the plasma confinement tube 134 as a liquid or as a slurry and may be atomized by either an inert or a reactive gas. The plasma confinement tube 134 may be provided with any desired number of such radial injection ports 180, each of which may be used to inject a different coating material into the plasma jet, thus allowing for the possibility of creating compound surface coatings. Further, the various materials may be injected at various locations along the axial length of the plasma confinement tube 134 to control the oxidation/reduction state of the material in the plasma, thus facilitate various oxidative/reductive reactions in the surface coating.

Referring back now to FIG. 1, the liquid injection system 26 that is used to inject the liquid reactant mixture 15 into the plasma gun 12 includes a reservoir 30 adapted to receive a liquid carrier composition 13 (e.g., water) and a liquid chemical composition 19 (e.g., any of a variety of metal salts), as will be described in greater detail below. The resulting liquid reactant material 15 is drawn from he reservoir 30 by a pump 36, which increases the pressure of the liquid reactant material 15. A metering pump 38 connected to the pump 36 regulates the pressure and flow rate of the liquid reactant mixture 15 and injects the mixture 15 into the plasma gun 12.

If the "film cooled" plasma confinement tube 34 is used, then the liquid injection plasma deposition assembly 10 may also include a liquid collection system 28 connected to the plasma gun 12 to recover excess liquid reactant 15 from the plasma gun 12, i.e., the left over liquid reactant from the film cooling process that is used to cool the plasma confinement tube 34. The liquid collection system 28 may return the recovered excess liquid reactant mixture 15 to the reservoir 30 where it is recirculated and re-injected into the plasma gun 12. Alternatively, the recovered liquid reactant mixture 15 may be discharged into a suitable drain 40.

A significant advantage of the liquid injection plasma deposition assembly 10 according to the present invention is the plasma confinement tube 34 which allows the coating material 19 to be injected into the plasma jet 14 in a liquid state, as part of the liquid reactant mixture 15. The ability to inject the coating material into the plasma jet 14 in the liquid state results in much more complete and uniform vaporization of the coating material 19 within the plasma jet 14. That portion of the coating material 19 that is not vaporized and remains in the liquid state is dispersed in the form of much smaller droplets than was typically realized with prior art thermal spraying apparatus. The more complete vaporization and much smaller liquid droplet size of the coating material 19 comprising material stream 16 results in coatings of much higher quality in terms of adhesion, density, fracture toughness, hardness, composition homogeneity, uniformity, surface smoothness, and microstructure development.

Another advantage of the liquid injection plasma deposition apparatus 10 is that it can be used to deposit a wide variety of coatings with a wide variety of compositions. For example, one embodiment 112 of the plasma gun may be used to inject several different coating materials in the form of several different liquid reactant mixtures 115, 116, and 117, as best seen in FIG. 8. Each liquid reactant mixture may be selectively atomized with either an inert or a reactive atomization gas. Further, the various materials may be injected at various locations along the axial length of the plasma confinement tube 134. Selective variation of these process parameters will allow a user of the liquid injection plasma deposition apparatus 10 to control the oxidation/reduction state of the material in the plasma, thus facilitate various oxidative/reductive reactions in the surface coating.

Still another advantage of the liquid injection plasma deposition apparatus 10 is that is capable of very high deposition rates, on the order of 0.5–1.0 mm/hr. Moreover, coatings of relatively high quality can be deposited at atmospheric pressure, thus dispensing with the need to resort to expensive and cumbersome vacuum chambers, with all their associated disadvantages. Put simply, then, the liquid injection plasma torch deposition apparatus 10 is capable of depositing the high quality surface coatings typically associated with more expensive deposition processes, such as chemical vapor deposition, while retaining the high deposition rates typically associated with prior art plasma spraying processes.

Having generally described the liquid injection plasma deposition apparatus 10, as well as some of the significant features and advantages of the invention, the liquid injection plasma deposition apparatus 10 will now be described in detail. Referring now specifically to FIG. 1, the liquid injection plasma deposition apparatus 10 may comprise a plasma gun 12 to which is connected a liquid injection system 26 and a liquid collection system 28. The liquid injection system 26 is adapted to inject the liquid reactant material 15 into a pair of inlet tubes 42 and 44 that are attached to the plasma gun 12. The liquid injection system 26 comprises a reservoir 30 adapted to receive the liquid carrier composition 13 and the chemical composition 19 that comprises the material to be deposited on the surface 18 of object 20.

The liquid carrier composition 13 may comprise any liquid material capable of dissolving the particular chemical composition 19 that is to be used. In most cases, the liquid carrier composition will comprise water, although other materials, such as pure alcohols, including, for example, methanol, ethanol, and propanol, as well as alcohol and water mixtures, could also be used. The chemical composition 19 may comprise whatever material is to be deposited onto the surface 18 of object 20. For example, the chemical composition 19 may comprise soluble metal salts, such as perchlorates (e.g., $Zr(ClO_4)_2$, $Ba(ClO_4)_2$); nitrates (e.g., $Ni(NO_3)_2$, $Co(NO_3)_2$), $ZrO(NO_3)_2$); chlorides (e.g., $FeCl_3$, $ZnCl_2$); acetates (e.g., $Cu(C_2H_2O_2)_2$, $Ba(C_2H_2O_2)_2$); sulphates (e.g., $Zr(SO_4)_2$, $Na_2SO_4$), and nitrites (e.g., $Ba(NO_2)_2$, $KNO_2$), which may be used to produce nearly every kind of oxide coating, including, for example, alumina, zirconia, and ferrite a coatings, or metal coatings, such as, for example, copper, iron, cobalt, nickel, molybdenum, and tungsten or any of their combinations. Other liquid reactants, such as $BCl_3$, $SiCl_4$, and $TiCl_4$ can be used to synthesize non-oxide coatings, (e.g. $B_4C$, BN, SiC, $Si_3N_4$, TiC, TiN, and $TiSi_2$) as well as cermet coatings.

Regardless of the particular compositions comprising the liquid carrier 13 and the chemical composition 19, the resulting liquid reactant mixture 15 is drawn from the reservoir 30 by pump 36 which pressurizes the mixture 15 to a pressure in the range of about 60 psia to 180 psia. The metering pump 38 connected to the pump 36 regulates the pressure and flow rate of the liquid reactant material 15 that is injected into the plasma gun 12. While the particular injection pressures and flow rates will vary depending on the capacity or size of the plasma gun 12, the desired deposition rate, as well as on the desired characteristics of the deposited film, one embodiment uses an injection pressure in the range of about 60 to 180 psia, and a liquid reactant material flow rate in the range of about 10 to 200 cc/min.

The liquid collection system 28 is connected to a pair of outlet tubes 48, 50 connected to the plasma gun 12 and may include a pump 52 to aid in returning the collected liquid reactant mixture 15 to the reservoir 30. The liquid collection system 28 may also include a pair of valves 54, 56 that may be opened and closed as necessary to direct the collected liquid reactant material to either the reservoir 30 or into a suitable drain 40.

As mentioned above, the plasma gun 12 may be mounted to a deposition chamber 24 that is connected to a suitable vacuum pump apparatus (not shown) via exhaust port 58 to maintain the deposition chamber 24 at pressures suitable for depositing various films on the surface 18 of object 20. While the pressure of the deposition chamber 24 may be varied over a wide range depending on the desired characteristics of the surface coating, in most cases and with most materials, it will be desirable to maintain the pressure in the deposition chamber 24 within the range of about 1 to 760 torr. The deposition chamber 24 may also include a suitable substrate holding fixture or table 22 for supporting the object 20 during the deposition process. In most cases, it will be advantageous to provide the holding fixture 22 with a cooling system (not shown) to cool the object 20 being coated and keep it from overheating. Since a wide variety of holding fixtures and holding fixture cooling systems are readily available that could be used with the present invention, the particular holding fixture 22 and fixture cooling system (not shown) will not be described in further detail.

Figure 3:
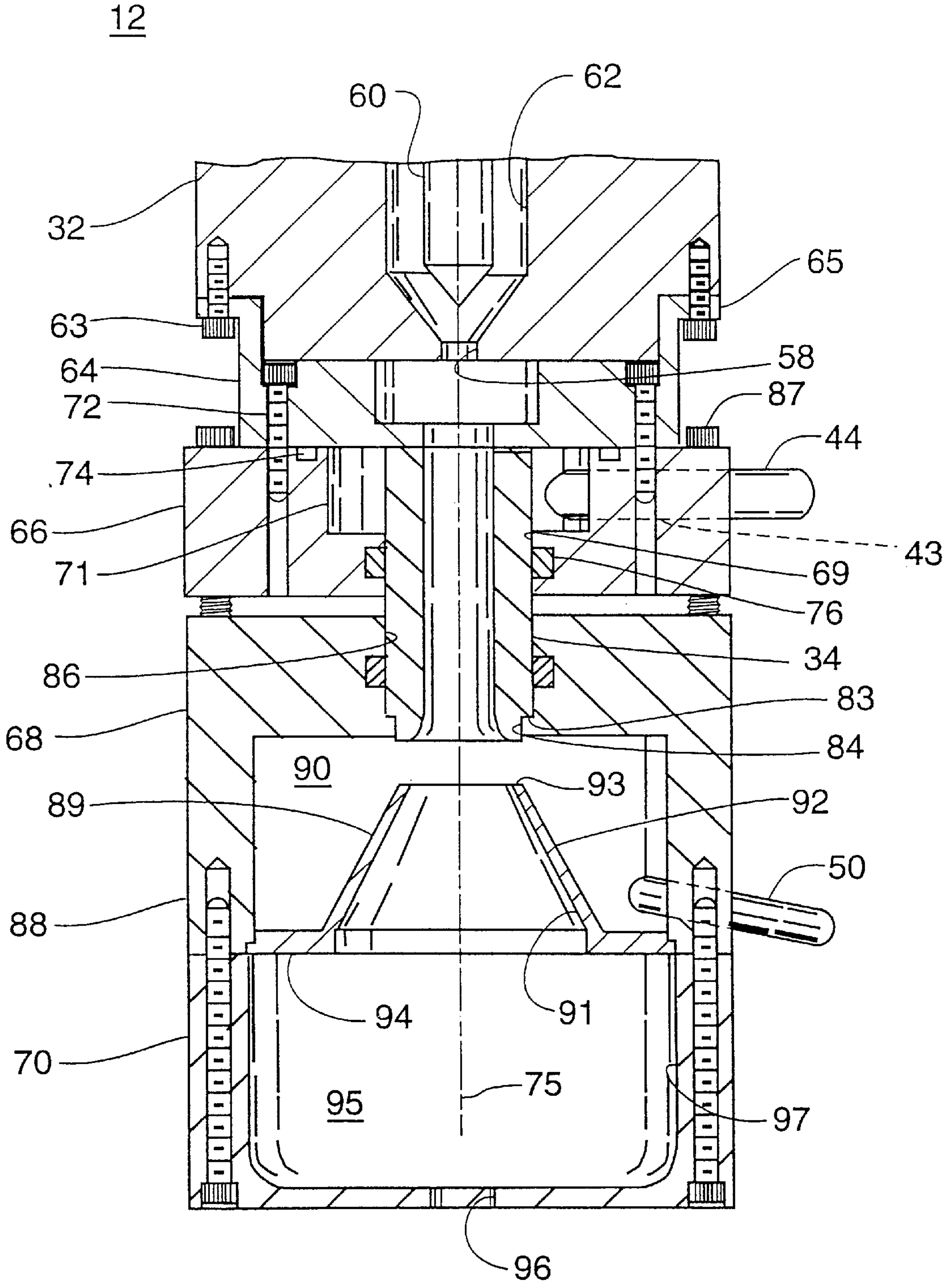
FIG. 3 is a sectional view in elevation of the plasma gun shown in FIG. 2.

The details of the plasma gun 12 are best seen by referring to FIGS. 2 and 3 with occasional reference to FIG. 1. Essentially, the plasma gun 12 comprises a conventional plasma torch assembly 32 to which is mounted an adapter 64, an upper reservoir assembly 66, a lower reservoir assembly 68, and a collimator 70. The plasma confinement tube 34 connects the upper and lower reservoir assemblies 66 and 68, and is aligned with the outlet nozzle 58 of the plasma torch assembly 32 so that the plasma jet 14 produced by the plasma torch assembly 32 passes through a central bore 78 in the plasma confinement tube 34.

The plasma torch assembly 32 may be any one of a wide variety of plasma torches that are well known and readily commercially available, thus will not be described in great detail herein. However, for the purpose of providing a background against which the present invention may be better understood, one embodiment of the present invention may utilize a plasma torch available from Metco, Inc., of Westbury N.Y. as model number 9MB. Essentially, such a plasma torch 32 may comprise a cathode 60, an anode 62, and an outlet nozzle 58. In addition, the plasma torch assembly 32 will usually have associated with it a wide variety of other components (not shown), such as, for example, a plasma gas inlet, a power supply, and any other ancillary components required to operate the plasma torch assembly 32.

In a typical plasma torch assembly 32, the cathode 60 and anode 62 are connected to the power supply (not shown) which creates an electrical discharge or arc (also not shown) between the cathode 60 and anode 62. The electrical discharge heats a plasma gas that is injected into the space between the cathode 60 and anode 62 to the point where the mean kinetic energy of the gas molecules is comparable to the ionization potential of the gas. Mutual collisions between the gas molecules continue the ionization process until an ionized plasma is formed. The heated plasma rapidly expands and is forcibly ejected through outlet nozzle 58. While argon is perhaps the most commonly used plasma gas, a wide variety of other gases may be used to generate the plasma depending on the particular coating application.

The upper reservoir assembly 66 is mounted to the plasma torch assembly 32 by an adapter 64 which allows the upper reservoir 66 and other attached components to be conveniently mounted to any of a wide variety of plasma torches by simply inserting the appropriate adapter 64 between the plasma torch assembly 32 and the upper reservoir assembly 66. However, if the upper reservoir assembly 66 and other attached components are to be mounted to only one type of plasma torch assembly 32, then the adapter 64 could be eliminated and the upper reservoir assembly 66 adapted to mount directly to the plasma torch assembly 32, as would be obvious to persons having ordinary skill in the art.

In the embodiment shown in FIGS. 2 and 3, the adapter 64 comprises a generally cylindrically shaped member having a mounting flange 65 that is adapted to receive the plasma torch assembly 32 and is fixedly secured thereto by a plurality of mounting bolts 63. The adapter 64 may also include a generally cylindrically shaped expansion chamber 67, to decrease the velocity and increase the pressure of the plasma entering the chamber 67. In one preferred embodiment, the adapter 64 comprises stainless steel, although any of a wide variety of similar materials could be used just as wall.

The upper reservoir assembly 66 is attached to the adapter 64 by a plurality of mounting bolts 72 and comprises a generally cylindrically shaped member having a central bore 69 adapted to receive the plasma confinement tube 34. Upper reservoir assembly 66 also includes an injection chamber 71 that is fluidically connected to the inlet tubes 42, 44 by a corresponding pair of passages, such as passage 43. A suitable sealing device, such as an O-ring seal 74, prevents the pressurized liquid reactant contained within the injection chamber 71 from leaking between the adapter 64 and upper reservoir assembly 66. A similar sealing device, such as another O-ring seal 76, prevents the liquid reactant from leaking past the plasma confinement tube 34. Again, while the upper reservoir assembly 66 in one preferred embodiment comprises stainless steel, any of a wide variety of similar materials could also be used, as would be obvious to persons having ordinary skill in the art.

Figure 4:
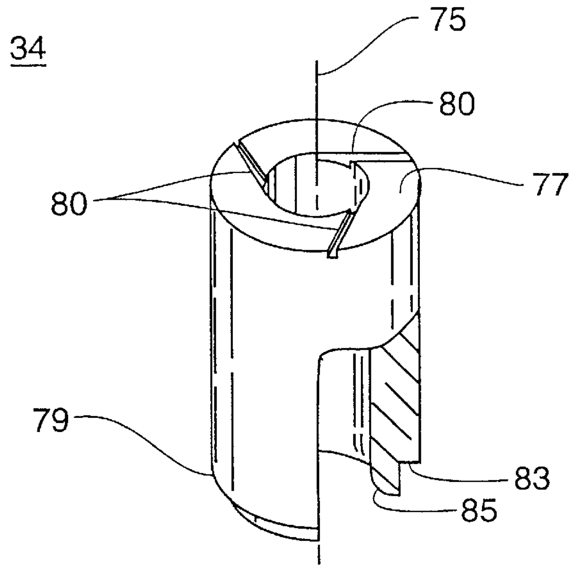
FIG. 4 is a perspective view of one embodiment of a plasma confinement tube showing the arrangement of the tangential injection ports and with a portion of the tube broken away to show the diverging nozzle at the outlet end.
Figure 5:
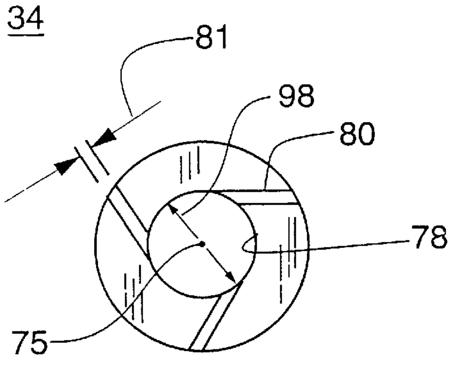
FIG. 5 is a plan view of the plasma confinement tube shown in FIG. 4.
Figure 6:
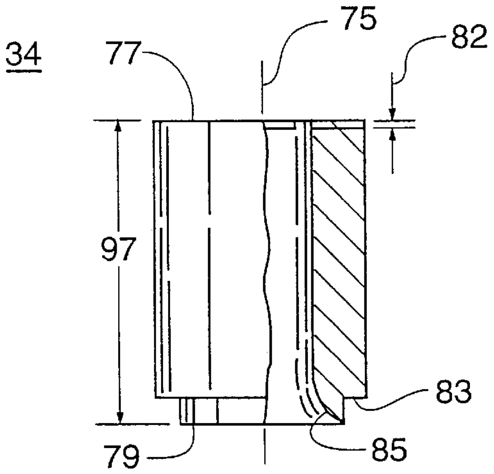
FIG. 6 is a side view in elevation of the plasma confinement tube shown in FIGS. 4 and 5 with a portion of the right hand side broken away to show the tangential injection port and diverging nozzle at the outlet end.

The details of the plasma confinement tube 34 are best seen by referring to FIGS. 4–6 simultaneously. The design of the plasma confinement tube 34 is important in achieving a constant, high-rate vaporization of the liquid reactant by the plasma jet 14, as will be described in greater detail below. Essentially, the plasma confinement tube 34 comprises a cylindrically shaped tube having a central bore 78 therethrough so as to define an inlet end 77 and an outlet end 79. The central bore 78, along with the outlet nozzle 58 of plasma torch assembly 32, are aligned along a flow axis 75. The inlet end 77 of plasma confinement tube 34 includes a plurality of tangential injection ports 80 that tangentially intersect the central bore 78, as best seen in FIG. 4. The size and number of each of the tangential injection ports 80 depends on the desired deposition rate of the coating and is also a function of the injection pressure that is maintained in the injection chamber 71 by the liquid injection system 26 (FIG. 1). Consequently, no single configuration of the tangential injection ports 80 (i.e., the number and size of each port) should be regarded as preferred. However, by way of example, one preferred embodiment utilizes three (3) tangential injection ports 80, each of which has a width 81 of about 0.016 inches and a depth 82 of about 0.004 inches.

The outlet end 79 of the plasma confinement tube 34 includes a shoulder portion 83 for engaging a mating flange 84 on the lower reservoir assembly 68, as is best seen in FIG. 3. The central bore 78 at the outlet end 79 of plasma confinement tube 34 also includes a diverging nozzle section 85, the purpose of which will be described greater detail below. While the plasma confinement tube 34 may be made from a wide variety of materials, in one preferred embodiment the plasma confinement tube 34 comprises stainless steel.

The overall size, e.g., the length 97 of the tube 34, as well as the diameter 98 of the central bore 78, will, of course, depend on the size and capacity of the plasma gun 12 as well as on the type of material or materials that are to be deposited. For example, if materials having relatively high melting points are to be deposited, then it will usually be preferred to utilize a relatively short plasma confinement tube 34 with a relatively small diameter central bore 78. Such dimensions will help to ensure that the plasma jet 14 is maintained at the highest possible temperature. Conversely, if a material having a relatively low melting point is to be deposited, then it may be preferable to utilize a longer plasma confinement tube 34 having a relatively large diameter central bore 78, which will have the effect of decreasing the temperature of the plasma jet 14. In still other circumstances, it may be desirable to use a relatively long and large diameter plasma confinement tube 34 even with a material having a relatively high melting temperature to decrease the temperature of the plasma jet 14 and partially condense into small droplets a portion of the vaporized coating material. In view of the foregoing considerations, then, no single set of dimensions for the plasma confinement tube 34 should be regarded as preferred. However, by way of example, one embodiment of the plasma confinement tube 34 may have a length 97 of about 1.75 inches, and the diameter 98 of the of the central bore 78 may be about 0.375 inches.

Still other embodiments of the plasma confinement tube 34 are possible. For example, if it is desired to accelerate the plasma jet 14 to sonic or supersonic velocity, then the central bore 78 of plasma confinement tube 34 should comprise a converging-diverging nozzle (not shown) having a throat section (also not shown) of sufficiently small cross-sectional area to accelerate the plasma jet to sonic velocity. The exit pressure of the nozzle may then be controlled as necessary to increase the velocity of the plasma jet to the desired supersonic velocity. The design parameters for constructing converging-diverging nozzles to accelerate gas flows (in this case plasma flows) to sonic and supersonic velocities are well-known and can be found in any of a wide variety of textbooks on compressible fluid mechanics, such as, for example, in Shapiro, A. R., *The Dynamics and Thermodynamics of Compressible Fluid Flow, Volume* 1, The Ronald Press Company, New York 1953, pp. 91–105, which is incorporated by reference herein for all it discloses. Therefore, the particular design parameters for such a converging diverging nozzle will not be described in further detail.

Referring back now to FIGS. 2 and 3, the lower reservoir assembly 68 comprises a generally cylindrically shaped member having an inlet end 86 and an outlet end 88 that are also aligned along flow axis 75. Lower reservoir assembly 68 includes a flange 84 that is adapted to receive the shoulder portion 83 of plasma confinement tube 34. The lower reservoir assembly 68 is secured to the upper reservoir assembly by a plurality of retaining bolts 87. The outlet end 88 of lower reservoir assembly 68 is adapted to receive a baffle 89 which, in combination with the lower reservoir assembly 68, defines a liquid collection chamber 90. The baffle 89 also prevents excess liquid reactant 15 from contacting the plasma jet 14. In one preferred embodiment, the lower reservoir assembly 68 is made from stainless steel, although a wide variety of other materials could be used just as easily.

Baffle 89 may comprise a separate component adapted to be received by the outlet end 88 of lower reservoir assembly 68, as best seen in FIG. 3. More specifically, baffle 89 may comprise an elongate, frustro-conical tube section 92 having a large diameter end 91 and a small diameter end 93. The large diameter end 91 also includes a flange portion 94 adapted to be received by the outlet end 88 of lower reservoir assembly 68. The arrangement of the baffle 89 within the lower reservoir assembly 68 is such that the small diameter end 93 of frustro-conical tube portion 92 is aligned with the nozzle portion 85 of plasma confinement tube 34 so that the plasma jet 14 exiting the nozzle portion 85 is directed into the small diameter end 93. The plasma jet 14 (not shown in FIG. 3, but shown in FIG. 1) then exits the baffle 89 through the large diameter end 91, which also forms the outlet end 88 of lower reservoir assembly 68. In one preferred embodiment, baffle 89 is constructed from stainless steel, although other materials could be used as well.

A collimator 70 attached to the outlet end 88 of lower reservoir assembly 68 defines an expansion chamber 95 to reduce the velocity and increase the pressure of the plasma jet 14. The collimator 70 also includes an outlet nozzle 96 aligned with flow axis 75. In one preferred embodiment, the collimator 70 comprises a hollow, cylindrically shaped member having a generally cylindrically shaped interior surface 97 and may be constructed from stainless steel. The interior surface 97 of expansion chamber 95 may also be coated with a heat resistant coating, such as zirconia, to prevent the hot plasma and material composition (not shown) contained within expansion chamber 95 from melting the collimator 70. The cross-sectional area of outlet nozzle 96 can be increased or decreased as necessary to achieve the desired flow rate. In one preferred embodiment, the outlet nozzle 96 has a diameter of about 0.375 inches to yield a cross-sectional area of about 0.110 square inches.

The operation of the plasma gun 12 is best understood by referring to FIGS. 1 and 3 simultaneously. As was briefly mentioned above, the plasma gun is started by first starting the plasma torch assembly 32 to produce a plasma jet 14. Generally, such plasma torch assemblies are started by first introducing a flow of plasma gas, such as argon, into the space between the cathode 60 and anode 62. An electrical discharge between the cathode 60 and anode 62 heats the surrounding plasma gas to the point where it ionizes. The resulting plasma rapidly expands and is forcibly ejected from the outlet nozzle 58, whereupon the plasma jet 14 passes through the expansion chamber 67 in adapter 64 and enters the inlet end 77 of plasma confinement tube 34. The liquid reactant mixture 15 supplied under a pressure in the range of about 60 psi to 180 psi by the liquid injection system 26 is injected into the central bore 78 through the tangential injection ports 80. The tangential injection ports 80 impart a swirling motion to the liquid reactant, causing it to swirl around the central bore 78 and cling to the central bore 78 as a thin film. The thin film of liquid reactant 15 swirling around the central bore 78 of plasma confinement tube 34 serves two purposes. First, the thin film of liquid reactant 15 exposes the chemical composition 19 comprising the coating material to the high temperature plasma jet 14. The high temperature plasma jet 14 quickly heats the liquid reactant mixture 15 to a temperature of about 2500° K., which is usually sufficient to vaporize and dissociate the liquid carrier composition 13 and chemical composition 19 comprising liquid reactant mixture 15. The uniform mixing resulting from the swirling or vortex motion of the liquid reactant mixture 15 in the plasma confinement tube 34 also tends to discourage the formation of large molten droplets of the coating material, which helps to produce higher quality surface coatings. A sufficient amount of liquid reactant material 15 must be injected into the plasma confinement tube 34 so that the liquid reactant material 15 will form a thin film (not shown) along the entire length 97 of the plasma confinement tube 34, thus cooling the tube 34 and dispensing with the need to provide external coolant to the tube 34. Again, while the injection rate or flow rate of the liquid reactant material 15 will depend in large part upon the overall size (i.e., capacity) of the plasma gun 12, in one preferred embodiment, the liquid reactant material 15 is injected into the plasma confinement tube 34 at the rate of about 10 to 200 cc/min.

Since the thin film of liquid reactant mixture 15 clings to the interior wall of the central bore 17, the diverging nozzle section 85 at the outlet end 79 helps to direct excess liquid reactant mixture 15 radially outward upon exiting the tube 34. The excess liquid reactant mixture 15 then accumulates in the liquid collection chamber 90 whereupon it is removed by the liquid collection system 28 connected to the outlet tubes 48 and 50. The high velocity plasma jet, along with the entrained coating material, which may comprise evaporated chemical composition 19 and/or liquid and solid components of chemical composition 19, continues along the flow axis 75 and enters the small diameter end 93 of frustro-conical tube portion 92 of baffle 89. The expanding cross-sectional area of the frustro-conical tube portion 92 decreases the velocity and increases the pressure of the plasma jet 14. The velocity of the plasma jet 14 is further decreased and the pressure further increased when the plasma enters the expansion chamber 95. The decreased velocity of the plasma jet results in a pressure and temperature increase in the expansion chamber 95. The increased temperature of the plasma and material composition within the chamber 95 helps to prevent the chemical composition 19 comprising the material to be deposited from condensing back into the liquid state. Finally, the plasma and entrained coating material are rapidly ejected from the small outlet nozzle 96 in collimator 70, where it emerges as a plasma jet 14 and a material stream 16, as best seen in FIG. 1.

As was briefly mentioned above, the deposition process may be performed in a deposition chamber 24 under a "soft" vacuum, at a pressure in the range of about 1 to 760 torr, or at atmospheric pressure, depending on desired characteristics of the deposited material.

Many other factors also affect the characteristics of the deposited material. For example, the concentration of the chemical composition 19 comprising the coating material in the liquid reactant mixture 15, the flow rate of the liquid reactant mixture 15, the evaporation rate of the liquid reactant mixture 15, and the chemical vapor and/or ultra-fine particle transport efficiency will determine the deposition rate and the growth rate of the coating 17. Similarly, the temperature of the object or substrate 20 will also significantly influence the microstructure development, density, and adhesion of the coating 17. Homogenous or heterogeneous nucleation and condensation of chemical vapors and/or ultra-fine particles on the surface of the coating will affect the surface smoothness, microstructure, and epitaxy of the coating. Furthermore, the surface temperature of the coating will have a significant influence on the coating density by affecting particle sintering and growth. Since a wide number of parameters can affect the characteristics of the deposited material, no one parameter or set of parameters identified above should be regarded as preferred.

Another embodiment 112 of the plasma gun is shown in FIGS. 7 and 8, and comprises the second embodiment 134 of the plasma confinement tube. Essentially, the plasma gun 112 comprises a conventional plasma torch assembly 132 to which is mounted an adapter 164 and a plasma confinement tube assembly 134. As was the case for the first embodiment shown in FIGS. 2 and 3, the plasma confinement tube 134 shown in FIGS. 7 and 8 is aligned with the outlet nozzle 158 of the plasma torch assembly 132 and flow axis 175 so that the plasma jet produced by the plasma torch assembly 132 passes through a central bore 178 in the plasma confinement tube 134.

The plasma torch assembly 132 may be identical to the plasma torch assembly 32 and may comprise a cathode 160, an anode 162, and an outlet nozzle 158. As was the case for the plasma torch assembly 32, plasma torch assembly 132 usually has associated with it a wide variety of other components (not shown), such as, for example, a plasma gas inlet, a power supply, and other components that may be required to operate the plasma torch assembly 132.

The plasma confinement tube 134 is mounted to the plasma torch assembly 132 by an adapter 164, which allows the plasma confinement tube 134 to be conveniently mounted to any of a wide variety of plasma torches by simply inserting the appropriate adapter 164 between the plasma torch assembly 32 and the plasma confinement tube 134. However, if the plasma confinement tube 134 is to be mounted to only one type of plasma torch assembly 132, then the adapter 164 could be eliminated and the plasma confinement tube 134 adapted to mount directly to the plasma torch assembly 132, as would be obvious to persons having ordinary skill in the art.

In the embodiment shown in FIGS. 7 and 8, the adapter 164 comprises a generally cylindrically shaped member having a mounting flange 165 that is adapted to receive the plasma torch assembly 132 and is fixedly secured thereto by a plurality of mounting bolts 163. The adapter 164 also includes a generally cylindrically shaped expansion chamber 167. In one preferred embodiment, the adapter 164 comprises stainless steel, although a wide variety of other materials could also be used, as would be obvious to persons having ordinary skill in the art.

The plasma confinement tube 134 may be secured to the adapter 164 by any convenient means, such as by welding. Essentially, plasma confinement tube 134 comprises a cylindrically shaped inner tube 139 having a central bore 178 therethrough so as to define an inlet end 177 and an outlet end 179. The central bore 178, along with the outlet nozzle 158 of plasma torch assembly 132, are aligned along flow axis 175. The plasma confinement tube 134 also includes a cooling jacket 131 that surrounds inner tube 139 and defines an annular cooling chamber 133 through which a suitable liquid coolant, such as water 199, may be circulated. In one preferred embodiment, the coolant 199 may be introduced into the annular cooling chamber 133 via an inlet tube 135 and withdrawn from the cooling chamber via an outlet tube 137. An end plate 141 connects the inner tube 139 and the cooling jacket 131 and includes an outlet nozzle 196 that is aligned with flow axis 175.

As was described above, plasma confinement tube 134 comprises a plurality of radial injection ports 180 through which the coating material may be injected. More specifically, one embodiment of the plasma confinement tube 134 may comprise first, second, and third inlet tubes 151, 153, and 155, through which various liquid reactant materials, indicated by arrows 115, 116, and 117, respectively, may be injected under pressures ranging from about 40 pisa to 80 psia. The various liquid reactant materials, such as materials 115, 116, and 117, may be injected into the plasma confinement tube 134 by a suitable liquid injection system (not shown), such as liquid injection system 26 shown in FIG. 1. In order to promote more rapid and uniform vaporization of the liquid reactant materials 115, 116, and 117, the mixtures 115, 116, and 117 may be first atomized by injecting respective atomization gases, represented by arrows 119, 121, and 123, through respective atomization tubes 161, 163, and 165 under pressures ranging from about 40 psia to 100 psia. The atomization gases may be injected into the atomization tubes 161, 163, and 165 by a suitable gas injection system (not shown) of the type well-known in the art for injecting gases at predetermined pressures and flow rates. As was mentioned above, the atomization gases may comprise either inert gases or reactive gases, depending on the type of material coating that is desired. Moreover, the plasma confinement tube 134 may be provided with any desired number of such radial injection ports 180, each of which may be used to inject a different coating material into the plasma jet, thus allowing for the possibility of creating compound surface coatings. The various materials may be injected at various locations along the axial length of the plasma confinement tube 134 to control the oxidation/reduction state of the material in the plasma to facilitate specific oxidative/reductive reactions in the coating material.

As was the case for the first plasma confinement tube 34, the length 197 and diameter 198 of the central bore 178 of tube 134 may be varied as necessary depending on the particular compositions that are injected into the plasma jet. For example, if materials having relatively high melting points are to be deposited, then it will usually be preferred to utilize a relatively short plasma confinement tube 134 with a relatively small diameter central bore 178. Such dimensions will help to ensure that the plasma jet is maintained at the highest possible temperature. Conversely, if materials having relatively low melting points are to be deposited, then it may be preferable to utilize a longer plasma confinement tube 134 having a relatively large diameter central bore 178, which will have the effect of decreasing the temperature of the plasma jet. In still other circumstances, it may be desirable to use a relatively long and large diameter plasma confinement tube 134, even with materials having relatively high melting temperatures, to decrease the temperature of the plasma jet and partially condense into small droplets portions of the vaporized coating materials. In view of the foregoing considerations, then, no single set of dimensions for the plasma confinement tube 134 should be regarded as preferred. However, by way of example, one embodiment of the plasma confinement tube 134 may have a length 197 of about 3.0 inches, and the diameter 198 of the of the central bore 178 may be about 0.5 inches.

It is contemplated that the inventive concepts herein described may be variously otherwise embodied and it is intended that the appended claims be construed to include alternative embodiments of the invention except insofar as limited by the prior art.

We claim:

1. Liquid injection plasma torch deposition apparatus for depositing material onto a surface of a substrate comprising:

plasma torch means for producing a plasma jet, said plasma torch means having an outlet nozzle through which the plasma jet escapes;

a plasma confinement tube having an inlet end and an outlet end aligned along a flow axis and having a central bore therethrough, the central bore of said plasma confinement tube being surrounded by a continuous side wall having an interior surface and an exterior surface, the inlet end of said plasma confinement tube being aligned with the outlet nozzle of said plasma torch means so that the plasma jet is directed into the inlet end od said plasma confinement tube and emerges from the outlet end of said plasma confinement tube, said plasma confinement tube also including an injection port transverse to the central bore;

a bottom reservoir having an inlet end and an outlet end aligned along the flow axis, said bottom reservoir being mounted to said plasma confinement tube so that the inlet end of said bottom reservoir is aligned with the outlet end of said plasma confinement tube, wherein said bottom reservoir collects excess liquid from said plasma confinement tube, said bottom reservoir further including baffle means having an inlet end and an outlet end aligned along the flow axis for preventing the excess liquid collected from said plasma confinement tube from contacting the plasma jet;

injection means connected to the injection port of said plasma confinement tube for injecting a liquid through the injection port and into the central bore of said plasma confinement tube, the liquid containing the material to be deposited onto the surface of the substrate.

2. The liquid injection plasma torch deposition apparatus of claim 1, further comprising a collimator having an inlet end and an outlet nozzle aligned along the flow axis, said collimator being mounted to said bottom reservoir so that the inlet end of said collimator is aligned with the outlet end of said bottom reservoir.

3. The liquid injection plasma torch deposition apparatus of claim 2, wherein said injection means comprises:

a reservoir containing a supply of the liquid; and pump means connected between said reservoir and the injection port of said plasma confinement tube for increasing the pressure of the liquid in the reservoir to a first pressure and injecting the liquid into the injection port.

4. The liquid injection plasma torch deposition apparatus of claim 3, wherein the injection port in said plasma confinement tube comprises a tangential injection port for injecting the liquid into the central bore of said plasma confinement tube in a tangential direction with respect to the central bore of said plasma confinement tube.

5. The liquid injection plasma torch deposition apparatus of claim 1, wherein the injection port in said plasma confinement tube comprises a first radial injection port for injecting the liquid into the central bore of said plasma confinement tube in a radial direction with respect to the central bore of said plasma confinement tube.

6. The liquid injection plasma torch deposition apparatus of claim 5, wherein said injection means comprises:

a first reservoir containing a supply of a first liquid; and first pump means connected between said first reservoir and said first radial injection port for increasing the pressure of the first liquid in the reservoir to a first pressure and injecting said first liquid into said first radial injection port.

7. The liquid injection plasma torch deposition apparatus of claim 6, further comprising a first inlet tube connected between said first radial injection port and said first pump means, said first inlet tube having an inlet end and an outlet end and having a central bore therethrough, the central bore of said first inlet tube having an interior surface and an exterior surface, and wherein said first inlet tube includes first atomization tube means in fluid communication with the central bore of said first inlet tube for injecting a first gas into the central bore of said first inlet tube in a radial direction with respect to the central bore of said first inlet tube.

8. The liquid injection plasma torch deposition apparatus of claim 7, wherein said plasma confinement tube includes a cooling jacket, and wherein said liquid injection plasma torch deposition apparatus includes coolant circulation means connected to said cooling jacket for circulating a coolant through said cooling jacket.

9. The liquid injection plasma torch deposition apparatus of claim 8, further comprising a second radial injection port and wherein said injection means includes a second reservoir containing a supply of a second liquid and second pump means connected between said second reservoir and said second radial injection port for increasing the pressure of the second liquid in the reservoir to a second pressure and injecting said second liquid into said second radial injection port.

10. The liquid injection plasma torch deposition apparatus of claim 9, further comprising a second inlet tube connected between said second radial injection port and said second pump means, said second inlet tube having an inlet end and an outlet end and having a central bore therethrough, the central bore of said second inlet tube having an interior surface and an exterior surface, and wherein said second inlet tube includes second atomization tube means in fluid communication with the central bore of said second inlet tube for injecting a second gas into the central bore of said second inlet tube in a radial direction with respect to the central bore of said second inlet tube.

11. The liquid injection plasma torch deposition apparatus of claim 10, further comprising a third radial injection port and wherein said injection means includes a third reservoir containing a supply of a third liquid and third pump means connected between said third reservoir and said third radial injection port for increasing the pressure of the third liquid in the reservoir to a third pressure and injecting said third liquid into said third radial injection port.

12. The liquid injection plasma torch deposition apparatus of claim 11 further comprising a third inlet tube connected between said third radial injection port and said third pump means, said third inlet tube having an inlet end and an outlet end and having a central bore therethrough, the central bore of said third inlet tube having an interior surface and an exterior surface, and wherein said third inlet tube includes third atomization tube means in fluid communication with the central bore of said third inlet tube for injecting a third gas into the central bore of said third inlet tube in a radial direction with respect to the central bore of said third inlet tube.

13. Liquid injection plasma torch deposition apparatus for depositing material onto a surface of a substrate, comprising:

plasma torch means for producing a plasma jet, said plasma torch means having an outlet nozzle through which the plasma let escapes;

a plasma confinement tube having an inlet end and an outlet end aligned along a flow axis and having a central bore therethrough, the central bore of said plasma confinement tube being surrounded by a continuous side wall having an interior surface and an exterior surface, the inlet end of said Plasma confinement tube being aligned with the outlet nozzle of said plasma torch means so that the plasma jet is directed into the inlet end of said plasma confinement tube and emerges from the outlet end of said plasma confinement tube, said plasma confinement tube also including an injection port positioned substantially tangentially with respect to the central bore;

a reservoir containing a supply of a liquid containing the material to be deposited onto the surface of the substrate;

pump means connected between said reservoir and the injection port of said plasma confinement tube for increasing the pressure of the liquid in the reservoir to a first pressure and injecting the liquid into the injection port;

a bottom reservoir having an inlet end and an outlet end aligned along the flow axis, said bottom reservoir being mounted to said plasma confinement tube so that the inlet end of said bottom reservoir is aligned with the outlet end of said plasma confinement tube;

a baffle operatively associated with said bottom reservoir, said baffle comprising an elongate frustro-conical tube having a large diameter end, a small diameter end, and a bore therethrough for receiving the plasma jet, the bore being surrounded by a continuous side wall, the small diameter end of said elongate frustro-conical tube comprising an inlet end of said baffle and being aligned with the inlet end of said bottom reservoir so that the plasma jet passing through the inlet end of said bottom reservoir is directed into the inlet end of said baffle, the large diameter end of said elongate frustro-conical tube being connected to the outlet end of said bottom reservoir so that the large diameter end of said elongate frustro-conical tube comprises the outlet end of said bottom reservoir; and a collimator having an inlet end and an outlet nozzle aligned along the flow axis, said collimator being mounted to said bottom reservoir so that the inlet end of said collimator is aligned with the outlet end of said bottom reservoir.

14. The liquid injection plasma torch deposition apparatus of claim 13, wherein the outlet end of said plasma confinement tube comprises a diverging nozzle.

15. The liquid injection plasma torch deposition apparatus of claim 14, further comprising excess liquid collection means in fluid communication with said bottom reservoir for collecting the excess liquid collected by said bottom reservoir.

16. The liquid injection plasma torch deposition apparatus of claim 14, wherein said excess liquid collection means is connected to said reservoir and wherein excess liquid from said plasma confinement tube is returned to said reservoir.

17. The liquid injection plasma torch deposition apparatus of claim 16, wherein said first pressure is in the range of about 60 to 180 pounds per square inch absolute.

18. A plasma gun, comprising:

plasma torch means for producing a plasma jet, said plasma torch means having an outlet nozzle through which the plasma jet escapes;

a plasma confinement tube having an inlet end and an outlet end aligned along a flow axis and having a central bore therethrough, the central bore of said plasma confinement tube being surrounded by a continuous side wall having an interior surface and an exterior surface, the inlet end of said plasma confinement tube being aligned with the outlet nozzle of said plasma torch means so that the plasma jet is directed into the inlet end of said plasma confinement tube and emerges from the outlet end of said plasma confinement tube, said plasma confinement tube also including an injection port transverse to the central bore;

a bottom reservoir having an inlet end and an outlet end aligned along the flow axis, said bottom reservoir being mounted to said plasma confinement tube so that the inlet end of said bottom reservoir is aligned with the outlet end of said plasma confinement tube, wherein said bottom reservoir collects excess liquid from said plasma confinement tube, said bottom reservoir further including baffle means having an inlet end and an outlet end aligned along the flow axis for preventing the excess liquid collected from said plasma confinement tube from contacting the plasma jet.

19. The plasma gun of claim 18, wherein said bottom reservoir includes baffle means having an inlet end and an outlet end aligned along the flow axis for preventing the excess liquid collected from said plasma confinement tube from contacting the plasma jet.

20. The plasma gun of claim 19, wherein the injection port in said plasma confinement tube comprises a tangential injection port for injecting the liquid into the central bore of said plasma confinement tube in a tangential direction with respect to the central bore of said plasma confinement tube.

21. The plasma gun of claim 18, wherein the injection port in said plasma confinement tube comprises a first radial injection port for injecting the liquid into the central bore of said plasma confinement tube in a radial direction with respect to the central bore of said plasma confinement tube.

22. The plasma gun of claim 21, further comprising a first inlet tube connected to said first radial injection port, said first inlet tube having an inlet end and an outlet end and having a central bore therethrough, the central bore of said first inlet tube having an interior surface and an exterior surface, and wherein said first inlet tube includes first atomization tube means in fluid communication with the central bore of said first inlet tube for injecting a first gas into the a central bore of said first inlet tube in a radial direction with respect to the central bore of said first inlet tube.

23. The plasma gun of claim 22, wherein said plasma confinement tube includes a cooling jacket through which is circulated a coolant.

24. The plasma gun of claim 23, further comprising a second radial injection port for injecting a second liquid into the central bore of said plasma confinement tube in a radial direction with respect to the central bore of said plasma confinement tube.

25. The plasma gun of claim 24, further comprising a second inlet tube connected to said second radial injection port, said second inlet tube having an inlet end and an outlet end and having a central bore therethrough, the central bore of said second inlet tube having an interior surface and an exterior surface, and wherein said second inlet tube includes second atomization tube means in fluid communication with the central bore of said second inlet tube for injecting a second gas into the central bore of said second inlet tube in a radial direction with respect to the central bore of said second inlet tube.

26. The plasma gun of claim 25, further comprising a third radial injection port for injecting a third liquid into the central bore of said plasma confinement tube in a radial direction with respect to the central bore of said plasma confinement tube.

27. The plasma gun of claim 26, further comprising a third inlet tube connected to said third radial injection port, said third inlet tube having an inlet end and an outlet end and having a central bore therethrough, the central bore of said third inlet tube having an interior surface and an exterior surface, and wherein said third inlet tube includes third atomization tube means in fluid communication with the central bore of said third inlet tube for injecting a third gas into the central bore of said third inlet tube in a radial direction with respect to the central bore of said third inlet tube.

28. A plasma gun, comprising;

plasma torch means for producing a plasma jet, said plasma torch means having an outlet nozzle through which the plasma jet escapes;

a plasma confinement tube having an inlet end and an outlet end aligned along a flow axis and having a central bore therethrough, the central bore of said plasma confinement tube being surrounded by a continuous side wall having an interior surface and an exterior surface, the inlet end of said plasma confinement tube being aligned with the outlet nozzle of said plasma torch means so that the plasma jet is directed into the inlet end of said plasma confinement tube and emerges from the outlet end of said plasma confinement tube, said plasma confinement tube also including an injection port positioned substantially tangentially with respect to the central bore;

a bottom reservoir having an inlet end and an outlet end aligned along the flow axis, said bottom reservoir being mounted to said plasma confinement tube so that the inlet end of said bottom reservoir is aligned with the outlet end of said plasma confinement tube;

a baffle operatively associated with said bottom reservoir, said baffle comprising an elongate frustro-conical tube having a large diameter end, a small diameter end, and a bore therethrough for receiving the plasma jet, the bore being surrounded by a continuous side wall, the small diameter end of said frustro-conical tube comprising an inlet end of said baffle and being aligned with the inlet end of said bottom reservoir so that the plasma jet passing through the inlet end of said bottom reservoir is directed into the inlet end of said baffle, the large diameter end of said frustro-conical tube being connected to the outlet end of said bottom reservoir so that the large diameter end of said frustro-conical tube comprises both an outlet end of said baffle and the outlet end of said bottom reservoir; and a collimator having an inlet end and an outlet nozzle aligned along the flow axis, said collimator being mounted to said bottom reservoir so that the inlet end of said collimator is aligned with the outlet end of said bottom reservoir.

29. The plasma gun of claim 28, wherein the outlet end of said plasma confinement tube comprises a diverging nozzle.

* * * * *